United States Patent
Jaiswal et al.

(10) Patent No.: US 12,111,885 B2
(45) Date of Patent: Oct. 8, 2024

(54) IMAGE DISPOSITIONING USING MACHINE LEARNING

(71) Applicant: International Business Machines Corporation, Armonk, NY (US)

(72) Inventors: Mayoore Selvarasa Jaiswal, Austin, TX (US); Anne Elizabeth Gattiker, Austin, TX (US); Matthew Comer, Austin, TX (US); Mary D. Swift, Rochester, NY (US); Ambal Balakrishnan, Austin, TX (US); Florian Pinel, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 397 days.

(21) Appl. No.: 17/359,959

(22) Filed: Jun. 28, 2021

(65) Prior Publication Data

US 2022/0414396 A1  Dec. 29, 2022

(51) Int. Cl.
G06V 20/30 (2022.01)
G06F 18/214 (2023.01)
G06N 3/08 (2023.01)

(52) U.S. Cl.
CPC ............. *G06F 18/214* (2023.01); *G06N 3/08* (2013.01)

(58) Field of Classification Search
CPC .......... G06N 3/08; G06N 5/045; G06N 3/044; G06N 3/045; G06N 3/0464; G06V 10/82; G06V 10/774; G06V 10/803; G06V 20/30; G06V 20/35; G06F 18/214
See application file for complete search history.

(56) References Cited

U.S. PATENT DOCUMENTS

| | | | |
|---|---|---|---|
| 8,180,826 B2 | 5/2012 | Hua et al. | |
| 8,798,401 B1 | 8/2014 | Johnson et al. | |
| 8,893,297 B2 | 11/2014 | Eversoll et al. | |
| 10,432,728 B2 | 10/2019 | Dachille et al. | |
| 10,460,231 B2 | 10/2019 | Zhang et al. | |
| 10,534,809 B2 | 1/2020 | Wiesel et al. | |
| 11,038,974 B1 * | 6/2021 | Koukoumidis | G06F 16/9038 |
| 11,361,152 B2 * | 6/2022 | Sharma | G06F 40/169 |
| 11,507,836 B1 * | 11/2022 | Kurz | G06N 3/0455 |
| 2005/0114672 A1 | 5/2005 | Duncan et al. | |

(Continued)

FOREIGN PATENT DOCUMENTS

| | | | | |
|---|---|---|---|---|
| CN | 108846138 A | * | 11/2018 | G06F 40/30 |
| CN | 113764112 A | * | 12/2021 | |
| CN | 115422323 A | * | 12/2022 | |

OTHER PUBLICATIONS

Anonymous, "Incremental sharing using machine learning," an IP.com Prior Art Database Technical Disclosure, IP.com No. IPCOM000252683D, Feb. 1, 2018, 33 pgs.

(Continued)

*Primary Examiner* — Aaron W Carter
(74) *Attorney, Agent, or Firm* — Aaron N. Pontikos

(57) ABSTRACT

Provided is a method, computer program product, and system for predicting image sharing decisions using machine learning. A processor may receive a set of annotated images and an associated text input from each user of a plurality of users. The processor may train, using the set of annotated images and the associated text input from each user, a neural network model to output an image sharing decision that is specific to a user.

19 Claims, 12 Drawing Sheets

(56) References Cited

U.S. PATENT DOCUMENTS

| | | | |
|---|---|---|---|
| 2005/0234864 A1 | 10/2005 | Shapiro | |
| 2013/0159411 A1 | 6/2013 | Bowen | |
| 2015/0043831 A1* | 2/2015 | Arfvidsson | H04L 67/10 |
| | | | 382/228 |
| 2016/0239724 A1* | 8/2016 | Arfvidsson | H04L 67/10 |
| 2016/0283738 A1* | 9/2016 | Wang | G06N 20/00 |
| 2017/0185871 A1 | 6/2017 | Zhang et al. | |
| 2018/0205848 A1* | 7/2018 | Kong | G06V 10/82 |
| 2018/0285357 A1* | 10/2018 | Chang | G06F 16/5838 |
| 2018/0337994 A1 | 11/2018 | Dachille et al. | |
| 2018/0349709 A1* | 12/2018 | Shinohara | G06V 20/52 |
| 2019/0050427 A1 | 2/2019 | Wiesel et al. | |
| 2019/0092318 A1* | 3/2019 | Mei | G06N 3/04 |
| 2020/0167401 A1* | 5/2020 | Hsieh | G06N 20/00 |
| 2020/0167689 A1* | 5/2020 | Pojman | G06V 20/176 |
| 2020/0242419 A1* | 7/2020 | Arfvidsson | G06F 18/2415 |
| 2020/0356774 A1* | 11/2020 | Korn | H04N 7/181 |
| 2020/0364538 A1* | 11/2020 | Lee | G06N 3/045 |
| 2022/0414396 A1* | 12/2022 | Jaiswal | G06N 3/08 |
| 2023/0025450 A1* | 1/2023 | De La Comble | G06N 3/082 |

OTHER PUBLICATIONS

Anonymous, "Machine-learned alt text for images and videos," an IP.com Prior Art Database Technical Disclosure, IP.com No. IPCOM000256745D, Dec. 27, 2018, 6 pgs.

Anonymous, "Machine-Learning Predicted User Interfaces," an IP.com Prior Art Database Technical Disclosure, IP.com No. IPCOM000252020D, Dec. 13, 2017, 36 pgs.

Bhandare et al., "Applications of Convolutional Neural Networks," (IJCSIT) International Journal of Computer Science and Information Technologies, vol. 7 (5), 2016, 2206-2215.

Chen et al., "You Look Twice: GaterNet for Dynamic Filter Selection in CNNs," 2019 IEEE/CVF Conference on Computer Vision and Pattern Recognition (CVPR), pp. 9164-9172, © IEEE Xplore.

Cheung et al., "Superposition of many models into one," arXiv:1902.05522v2 [cs.LG] Jun. 17, 2019, 18 pgs.

Github, "Classifying e-commerce products based on images and text—Adventures in Machine Learning," http://cbonnett.github.io/Insight.html, accessed Dec. 16, 2020, 4 pgs.

Gou et al., "KnowMe and ShareMe: Understanding Automatically Discovered Personality Traits from Social Media and User Sharing Preferences," https://www.researchgate.net/publication/262876461_KnowMe_and_ShareMe_Understanding_Automatically_Discovered_Personality_Traits_from_Social_Media_and_User_Sharing_Preferences, CHI 2014, One of a CHInd, Session: Personal Values and Preferences, Toronto, Canada, pp. 955-964.

Isdal, et al., "Privacy-Preserving P2P Data Sharing with OneSwarm," www.sigcomm.org/sites/default/files/ccr/papers/2010/October/1851275-1851198.pdf, SIGCOMM'10, Aug. 30-Sep. 3, 2010, New Delhi, India. © 2010 ACM.

Kim et al., "Deep Metric Learning Beyond Binary Supervision," 2019 IEEE/CVF Conference on Computer Vision and Pattern Recognition (CVPR), pp. 2283-2292, © IEEE IEEE Xplore.

Kim, Y. "Convolutional Neural Networks for Sentence Classification," https://www.aclweb.org/anthology/D14-1181/, Proceedings of the 2014 Conference on Empirical Methods in Natural Language Processing (EMNLP), pp. 1746-1751, Oct. 25-29, 2014, Doha, Qatar.

Mell et al., "The NIST Definition of Cloud Computing," Recommendations of the National Institute of Standards and Technology, U.S. Department of Commerce, Special Publication 800-145, Sep. 2011, 7 pgs.

O'Shea et al., "An Introduction to Convolutional Neural Networks," arXiv:1511.08458v2 [cs.NE] Dec. 2, 2015, 11 pgs.

Patil et al., "Who Gets to Know What When: Configuring Privacy Permissions in an Awareness Application," www.cs.loyola.edu/%7Elawrie/CS774/S06/research/p101-patilPrivacy.pdf, CHI 2005 | PAPERS: Privacy 1, 10 pgs.

Thoma, M., "Analysis and Optimization of Convolutional Neural Network Architectures," arXiv:1707.09725v1 [cs.CV] Jul. 31, 2017, 134 pgs.

*Agarwal et al. "VQA: Visual Question Answering", arXiv: 1505.00468, Oct. 27, 2017, 25 pages.

*Gupta et al. "Learning Rich Features from RGB-D Images for Object Detection and Segmentation", arXiv: 1407.5736, Jul. 22, 2014, 16 pages, https://doi.org/10.48550/arXiv. 1407.5736.

Mehanian et al. "Computer-Automated Malaria Diagnosis and Quantitation Using Convolutional Neural Networks", 2017 IEEE International Conference on Computer Vision Workshops, Oct. 22-29, 2017, 116-125, DOI: 10.1109/ICCVW.2017.22.

* cited by examiner

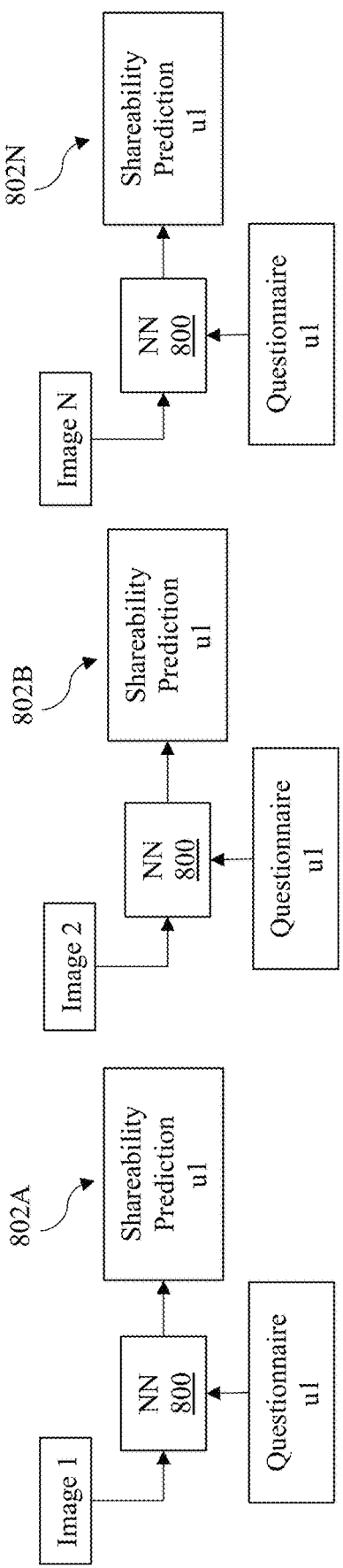
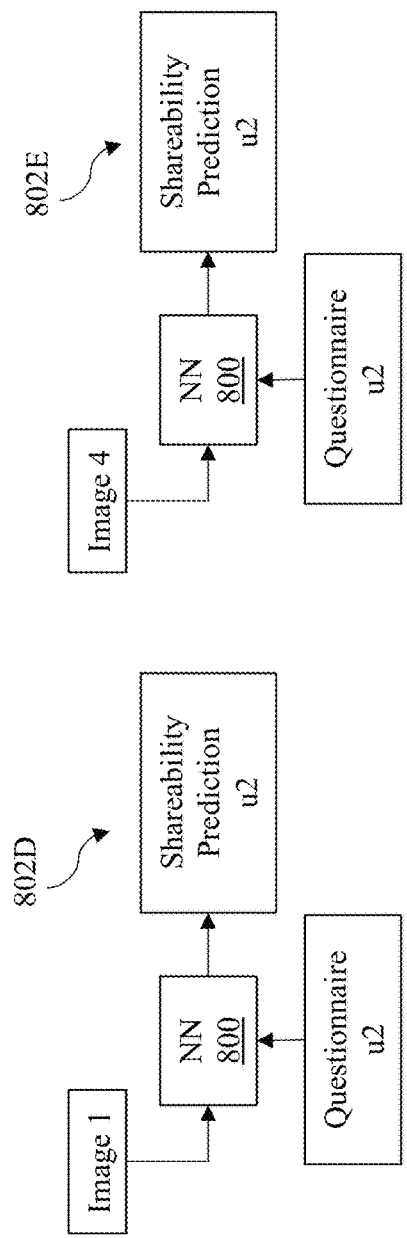

IMAGE DISPOSITIONING USING MACHINE LEARNING

BACKGROUND

The present disclosure relates generally to the field of image processing and, more specifically, to predicting image sharing decisions using machine learning techniques.

Users share various types of data over the Internet. For example, users may share various images on a public and/or private website (e.g., social media website, company website, and the like) for others to view. However, some users may be concerned about privacy related to the images they share. For example, some users may share various pictures or images such as those containing landscapes on social media, while keeping other pictures or images private, such as those containing people.

SUMMARY

Embodiments of the present disclosure include a method, computer program product, and system for predicting image sharing decisions using machine learning. A processor may receive a set of annotated images and an associated text input from each user of a plurality of users. The processor may train, using the set of images and the associated text input from each user of the plurality of users, a neural network model to output an image sharing decision that is specific to a user.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 8A, FIG. 8B, and FIG. 8C illustrate example shareability predictions for a first user, in accordance with embodiments of the present disclosure.

FIG. 8D and FIG. 8E illustrate example shareability predictions for a second user, in accordance with embodiments of the present disclosure.

Figure 1:
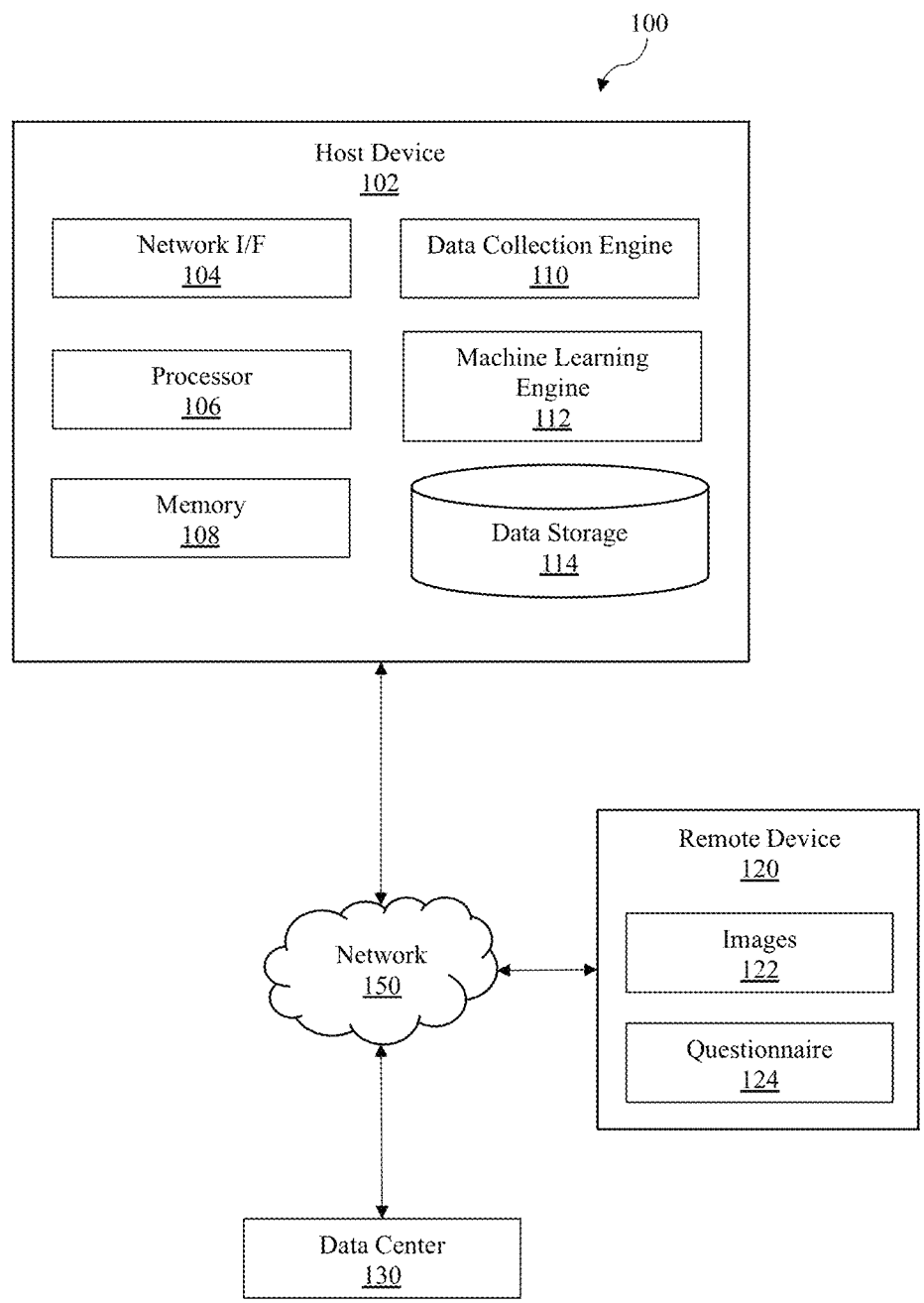
FIG. 1 illustrates a block diagram of an example image sharing prediction system, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate to the field of image processing and, more particularly, to predicting image sharing decisions using machine learning personalized to a user. While the present disclosure is not necessarily limited to such applications, various aspects of the disclosure may be appreciated through a discussion of various examples using this context.

Many users share various types of data over the Internet. For example, users may share images on a public and/or private website (e.g., social media website, company website, and the like). However, some users may be concerned about privacy related to the images they share. For example, some users may share various pictures or images such as those containing landscapes on social media, while keeping other pictures or images private, such as those containing people. In other instances, users may share their images with a certain audience (e.g., friends and/or family), while restricting sharing images with other audiences (e.g., public, workplace, etc.). As users become more privacy-sensitive, they may want to maintain control over whether or not their media (e.g., images, videos, and the like) are shared publicly, such as over the Internet or intranet.

One way for a user to maintain privacy of their data, specifically image related data, is to annotate each image or video with a sharing preference. The sharing preference may include whether to share the user's image related data with other users or various websites. However, it can be burdensome for a user to annotate or classify each image or video according to their privacy preferences. Further, as a user generates more media (e.g., new images, video, etc.), it may be inconvenient for the user to continually provide such an annotation when a new piece of media becomes available (e.g., the user adds a photo or video to a collection). Moreover, if the user changes their mind on a sharing preference (e.g., the user decides they no longer want to share images with a certain type of content), it can be burdensome to re-annotate media instances with the user's new sharing preference decisions.

Embodiments of the present disclosure relate to a system, method, and computer program product that utilizes machine learning to make personalized image sharing decisions for a user in an automated way. In embodiments, an image sharing decision may indicate a likelihood that a user would want to share a given image. In embodiments, the system may build and train a neural network that is configured to output the image sharing decision for a user. The neural network may be any kind of neural network that may be trained to analyze an image and an associated text input to predict the image sharing decision. To train the neural network, the system may collect/receive a set of annotated images and an associated text input (e.g., questionnaire) from each user of a plurality of users. Each image may be annotated with a specific image sharing decision relating to whether the given user would share the specific image or not (e.g., a "YES" or "NO" sharing preference). For example, an image of an animal may be annotated with a "YES" as the sharing preference, while an image of a person may be annotated with a "NO" as the sharing preference.

In embodiments, the associated text input may comprise a questionnaire that has a set of questions and answers regarding specifics about each of the corresponding user's image sharing preferences (e.g., based on type of image, features or attributes in the image, etc.). For example, the questionnaire may include a set of questions asking the given user if they would share an image having a person (e.g., a child, an adult, etc.) in the picture, or if the given user would share a picture having a landscape. In embodiments, the set of questions may consist of binary questions (e.g., "YES" or "NO") questions that each given user answers regarding their image sharing preferences.

In some embodiments, the system may input the images into the neural network by utilizing a matrix for each image. The matrix may be represented as a h×w×3 matrix, where 3 represents three color channels related to red, green, and blue, w represents a width of the image, and h represents a height of the image. Further, the system may input the questionnaire (e.g., the questions and answers) for the given user into the neural network using an encoded representation of the questions and answers. For example, the questionnaire inputs may be encoded using pre-trained word embeddings, which can capture semantic meaning. The neural network may be configured to predict if an inputted image is shareable or not, using the inputted image and inputted questionnaire. In embodiments, the image sharing decision may be based on or interpreted from a confidence score (e.g., between 0 and 1).

In embodiments, the system trains the neural network using the annotated images from each of the plurality of users and the corresponding user's questionnaire to allow the neural network to determine relationships, inferences, and/or correlations between the images, image sharing preferences obtained from questionnaires and shareability preferences obtained from image annotations. In other words, the image annotations and questionnaires for the plurality of users may teach the neural network to generate or predict an image sharing decision given an image and a completed questionnaire. The neural network does not require an image classifier to explicitly recognize content referred to in the questionnaire.

In embodiments, by incorporating the questionnaire input, the neural network may be used to provide a personalized image sharing decision using fewer annotated images for training than would be required without incorporating questionnaire input. Moreover, the neural network may be able to provide a personalized image sharing decision for a new user who has not provided annotated training data and an associated questionnaire for system training.

For example, if the system receives a new image from a first user, the system will determine if the first user is a new user or an existing user. If the first user is an existing user, then the system can utilize the first user's encoded questionnaire to make an image sharing decision for the new image. The system may forward propagate the inputted new image and encoded questionnaire through the neural network to predict whether to share the new image or not.

In embodiments, once the prediction for the image sharing decision is made, the system may automatically share or not share the new image without requiring confirmation from the first user. However, in some embodiments, the system may prompt the first user to confirm if the image sharing decision is correct. In some embodiments, the system may automatically share the image if the image sharing decision meets a certain confidence threshold. This obviates the need for the system to require user verification when performing image sharing decisions. However, in some embodiments, the system may still send a notification or prompt to inform a user that the model has shared a given image as a result of the image sharing decision. This allows the user to review any images that were shared and override the decision if needed.

In some embodiments, if the given user is not an existing user, the new user may only be required to complete the questionnaire and not supply annotated images if the model has been trained on an adequate number of other users' training data (e.g., annotated images and/or questionnaires). The system can input the new user's image or images and encoded questionnaire through the neural network to predict the image sharing decision or decisions for the new user's image or images.

In embodiments, the system may retrain the neural network based on feedback from the users. For example, the system may collect user confirmations or overrides as the system is in use and retrain the neural network using the collected data. In this way, the neural network may improve its prediction accuracy and/or performance when making image sharing decisions.

In some embodiments, the user(s) must opt into the system in order for the system to collect their information (e.g., image data, textual data, social media data, etc.), and the user may determine which audience types (e.g., third party websites, second users, etc.) can view or share their data. For example, during an initialization process, the system may inform the user of the types of data that it will collect (e.g., image data, video, etc.) and the reasons why the data is being collected. In these embodiments, the system will only start collecting the user information upon the user explicitly permitting the collection. Furthermore, the system may only collect the data that is necessary to provide image sharing decisions to the user. The data may be anonymized and/or encrypted while in use, and the data may only be maintained as needed for providing necessary actions. If the user chooses to opt out of the system, any user information previously collected may be permanently deleted.

The aforementioned advantages are example advantages, and not all advantages are discussed. Furthermore, embodiments of the present disclosure can exist that contain all, some, or none of the aforementioned advantages while remaining within the spirit and scope of the present disclosure.

With reference now to FIG. 1, shown is a block diagram of example image sharing prediction system 100, in accordance with embodiments of the present disclosure. In the illustrated embodiment, image sharing prediction system 100 includes host device 102 that is communicatively coupled to remote device 120 and data center 130 via network 150. Host device 102 and remote device 120 may be configured as any type of computer system and may be substantially similar to computer system 1101 of FIG. 11. Data center 130 may be any type of data repository and/or data storage system configured to store data (e.g., questionnaires, training data, raw data, image data, etc.). For example, data center 130 may be a server that stores image and/or video data that is accessible by host device 102. Data center 130 may include structured data, semi-structured data, unstructured data, and/or binary data. In embodiments, host device 102 and/or remote device 120 may be a stand-alone computing devices or virtual software applications. For example, host device 102 may be a virtual application located on a server (not shown) that is accessed by remote device 120 through a cloud computing network, while remote device 120 may be configured as a personal computer (e.g., laptop, desktop, smartphone, etc.) operated by a user. In embodiments, host device 102 may be configured as an image sharing service and/or application configured to analyze images received from remote device 120, where the host device 102 predicts image sharing preferences/decisions for a user. In some embodiments, the remote device 120 may include the host device 102 itself and/or all the host devices components.

Network 150 may be any type of communication network, such as a wireless network or a cloud computing network. Network 150 may be substantially similar to, or the same as, cloud computing environment 50 described in FIG. 9. In some embodiments, the network 150 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 150.

In some embodiments, network 150 can be implemented using any number of any suitable communications media. For example, the network may be a wide area network (WAN), a local area network (LAN), a personal area network (PAN), an internet, or an intranet. In certain embodiments, the various systems may be local to each other, and communicate via any appropriate local communication medium. For example, host device 102 may communicate with remote device 120 and data center 130 using a WAN, one or more hardwire connections (e.g., an Ethernet cable), and/or wireless communication networks. In some embodiments, the various systems may be communicatively coupled using a combination of one or more networks and/or one or more local connections. For example, in some embodiments host device 102 may communicate with data center 130 using a hardwired connection, while communication between remote device 120 and host device 102 may be through a wireless communication network.

In the illustrated embodiment, host device 102 includes network interface (I/F) 104, processor 106, memory 108, data collection engine 110, machine learning engine 112, and data storage 114. In embodiments, the remote device 120 and data center 130 may also contain similar components (e.g., processors, memories, network I/F, machine learning engines, etc.) as host device 102, however, for brevity purposes these components are not shown.

In embodiments, host device 102 may receive one or more questionnaires 124 and one or more images 122 from remote device 120. For example, a user may submit a completed questionnaire and a set of annotated images (e.g., training images) to the host device 102. It is contemplated that multiple users may submit images and questionnaires to the host device 102 using user device 120 (e.g., multiple user devices), however, for brevity purposes, only one user device 120 is shown. Further, it is also contemplated that the images 122 may include video images (e.g., such a video recordings) and are not limited to single media instances of images. The questionnaire 124 includes a set of binary questions related to a user's willingness to share various types of images. For example, a first question may ask the user if they would share an image of an animal, while a second question may ask the user if they would share an image of a person.

Data collection engine 110 collects a set of annotated images and a completed questionnaire from a plurality of users. Each set of annotated images is associated with a given user and a corresponding completed questionnaire is also associated with the same user. Data collection engine 110 may collect the annotated images and questionnaire(s) from remote device 120 and/or data center 130.

Machine learning engine 112 utilizes the questionnaire and the set of images collected from users to train a neural network to make predictions of image sharing decisions or preferences for a user. For example, the machine learning engine 112 may collect a plurality of annotated images and completed questionnaires from a plurality of users to build a two-stream neural network that includes components of both a convolutional neural network (CNN) and a recurrent neural network (RNN) to make image sharing decisions. The image sharing decision is tailored to a given user by use of the user's questionnaire. For example, the neural network may predict a sharing decision "YES" for a given image for a first user, but may predict a sharing decision "NO" for the same image for a second user, if the completed questionnaire is different for the first and second users. The neural network model learns relationships between the training images, the questionnaires, and the image sharing annotations to determine sharing preferences. The machine learning engine 112 may utilize various natural language processing techniques to analyze the questionnaire and/or annotation of the annotated images. In some embodiments, the system 100 may leverage pre-trained neural networks that are trained on larger publicly accessible datasets. In this way, the system may integrate both text inputs (questionnaires) and images as inputs into the neural network architecture which allows the system to train the neural network with a limited amount of data. Note the term "text input" is used to refer to a questionnaire, which contains both questions and the user's answers. In embodiments, the answers may be expressed in text-words (like "yes" or "no"), by an encoding of a "click" on a form, etc.

In embodiments, machine learning engine 112 may comprise various machine learning algorithms or models (e.g., convolution neural networks (CNN), recurrent neural networks (RNN), logical regression, support vector machines (SVM), artificial neural network, deep neural network, correlation engines, reinforcement feedback learning model, supervised/unsupervised learning model, etc.) configured to analyze various image features and textual inputs related to image sharing preferences to automatically make image sharing decisions.

In some embodiments, machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBDT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

FIG. 1 is intended to depict the representative major components of image sharing prediction system 100. In some embodiments, however, individual components may have greater or lesser complexity than as represented in FIG. 1, components other than or in addition to those shown in FIG. 1 may be present, and the number, type, and configuration of such components may vary. Likewise, one or more components shown with image sharing prediction system 100 may not be present, and the arrangement of components may vary.

For example, while FIG. 1 illustrates an example image sharing prediction system 100 having a single host device 102, a single remote device 120, and a single data center 130 that are communicatively coupled via a single network 150, suitable network architectures for implementing embodiments of this disclosure may include any number of host devices, remote devices, data centers, and networks. The various models, modules, systems, and components illustrated in FIG. 1 may exist, if at all, across a plurality of host devices, remote devices, and networks.

Figure 2A:
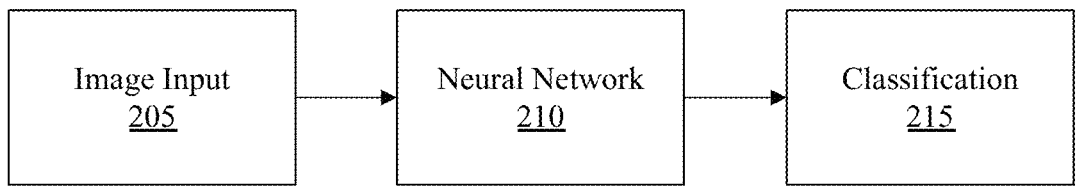
FIG. 2A illustrates an example representation of an image classification system.

Referring now to FIG. 2A, shown is an example representation of a typical image classification system 200A. In the illustrated embodiment, the image classification system 200A may use an image input 205 (e.g., images, pictures, etc.) to train neural network 210 to perform image classification 215 for various images. For example, the image classification system 200A may train a convolutional neural network (CNN) to classify various objects detected within an image. The neural network 210 is trained using RGB (red, green, blue) image inputs 205 that are each represented in a matrix. The matrix may be in the form of a h×w×3 matrix; where 3 represents three channels associated with the colors red, green, and blue; w represents a width of the image input and h represents a height of the image input. The matrix is configured in such a way that every pixel in an image input is described by its x-y location and associated values for the red, green, and blue channels. Using the image input 205, the neural network 210 may be trained to predict and/or make various image classifications 215. However, using a classification system to make user-specific classification decisions/predictions requires a different model to be trained for each user and may require a significant amount of training input images.

Figure 2B:
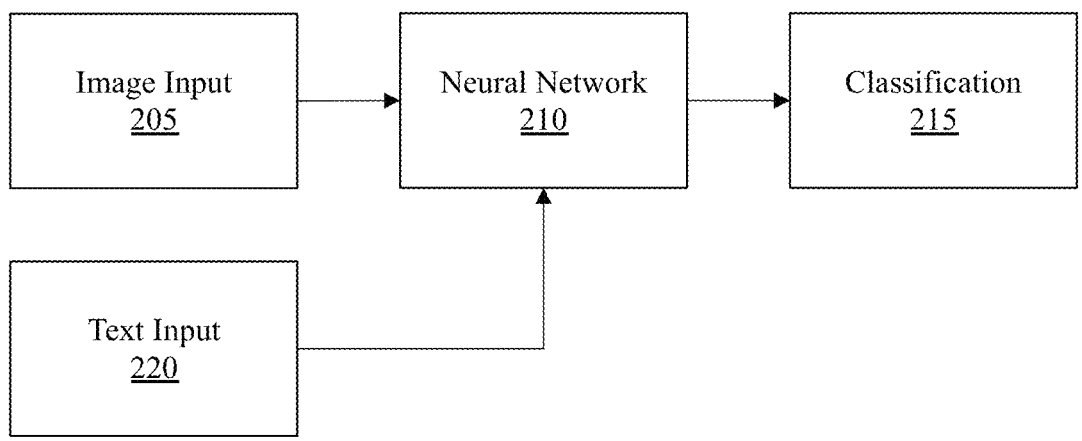
FIG. 2B illustrates an example representation of an image sharing prediction system, in accordance with embodiments of the present disclosure.

Referring now to FIG. 2B, shown is an example representation of an image sharing prediction system 200B, in accordance with embodiments of the present disclosure. In the illustrated embodiment, the personalized image sharing prediction system 200B uses a text input 220 that is associated with the user along with a user's image input 205. Using both image input 205 and text input 220, the neural network 210 may be trained to perform image classification 215 without requiring a different model to be trained for each user and allowing a personalized image sharing prediction to be made for a user with limited training data.

Figure 3:
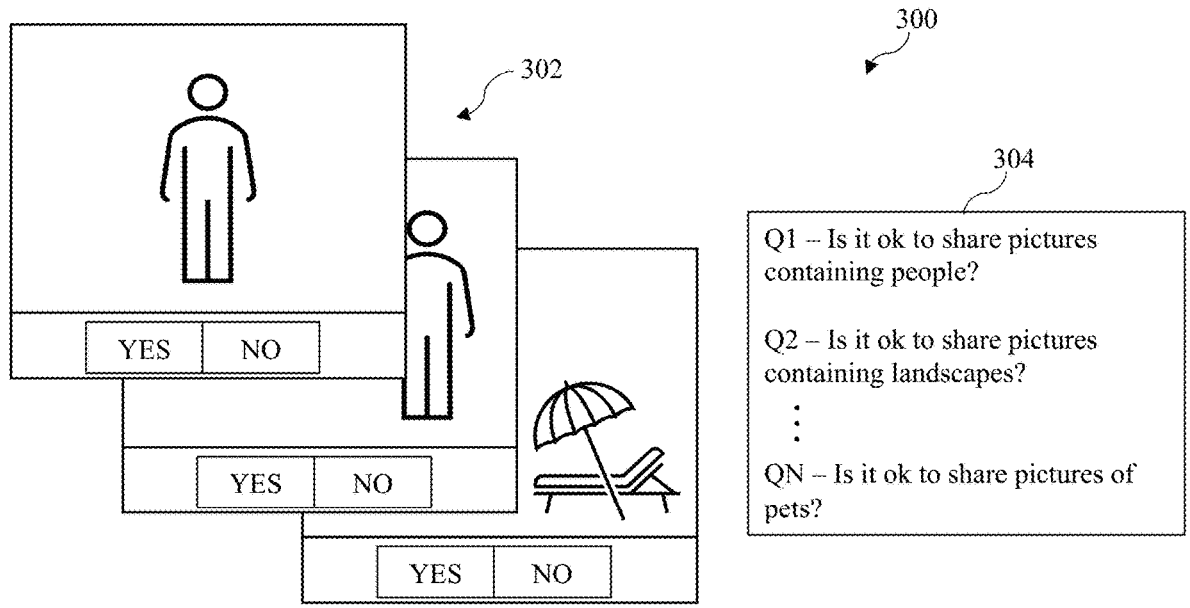
FIG. 3 illustrates an example representation of a set of annotated images and a questionnaire used to train a neural network, in accordance with embodiments of the present disclosure.

Referring now to FIG. 3, shown is an example representation 300 of a set of annotated images 302 and a questionnaire 304 used to train a neural network, in accordance with embodiments of the present disclosure. In the illustrated embodiment, each image of the set of annotated images 302 includes an annotation ("YES" or "NO") indicating if the user would share the specific image. For example, a user may determine that they would not share the first image ("NO"), not share the second image ("NO"), and would share the third image ("YES") based on the features/attributes captured in the given image. For example, the first image and second image may include a depiction of a person, while the third image may include a beach scene or landscape that does not include a person. For example, the user may not want to share pictures with people in them because they are unsure of the other peoples' privacy-sensitivity. In embodiments, the system will create a set of training data for the neural network using the sets of annotated images and the questionnaires for a set of users. In embodiments, the number of annotated image needed to train the system may vary based upon the desired image sharing decision accuracy. For example, the system may be trained using a small set of annotated images (e.g., 100, 200, etc.) per user in addition to an associated questionnaire.

In embodiments, questionnaire 304 includes a set of questions to be answered by the given user regarding image sharing preferences (e.g., privacy preference). The questionnaire may be related to or associated with the set of annotated images 302 and/or other potential images (new images) that will be analyzed by the system. In embodiments, the questions in the questionnaire 304 are constructed as binary questions (e.g., requiring a "YES" or a "NO" response). For example, a first question of the questionnaire may ask the user if they would share an image that has a person in it, while a second question may ask the user if they would share an image of a landscape. The user may respond with a "YES" or "NO" answer to the questions in the questionnaire.

Figure 4:
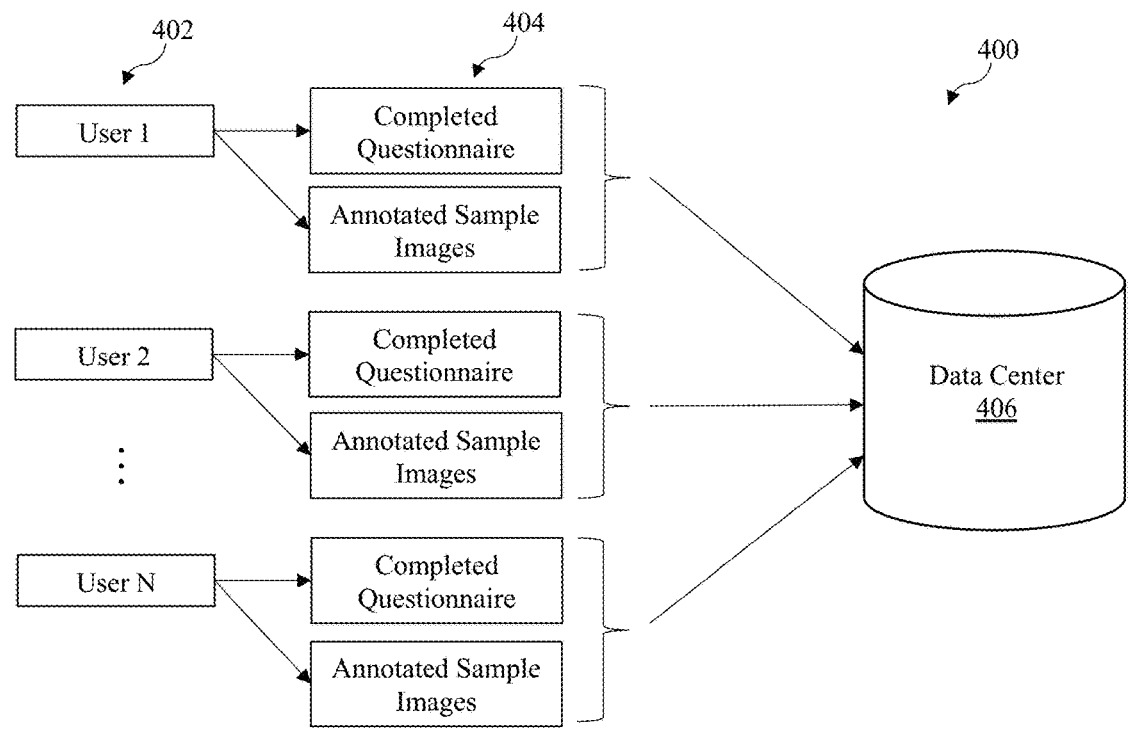
FIG. 4 illustrates an example diagram for collecting a set of annotated images and questionnaires from a plurality of users, in accordance with embodiments of the present disclosure.

Referring now to FIG. 4, shown is an example diagram 400 for collecting a set of annotated images and questionnaires 404 from a plurality of users 402, in accordance with embodiments of the present disclosure. In the illustrated embodiment, each user of the plurality of users 402 (referred to in the figure as User 1, User 2, and User N) has completed a set of annotated images and a questionnaire 404. Once completed, the system may collect and store the annotated images and questionnaire 404 in data center 406 where it may be accessed by the system and used to train the neural network. In embodiments, the system may create a dataset with each image owner's questionnaire, along with a set of images having corresponding binary labels (annotations) indicating if the image's owner agrees to share the image. The data set used to train the neural network includes questionnaires and a set of labeled images from the plurality of users 402.

Figure 5:
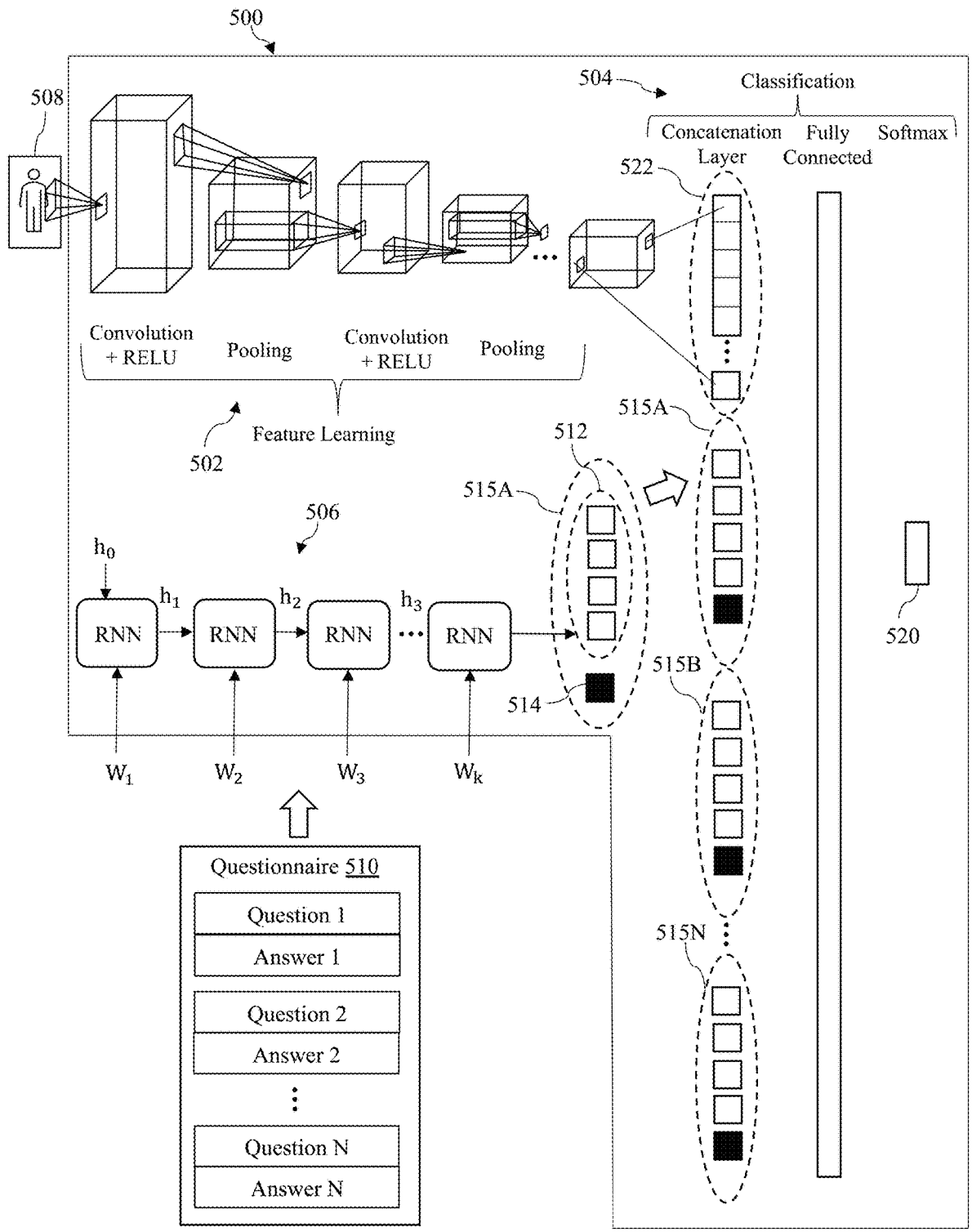
FIG. 5 illustrates an example sharing prediction neural network, in accordance with embodiments of the present disclosure.

Referring now to FIG. 5, shown is an example sharing prediction neural network 500, in accordance with embodiments of the present disclosure. In the illustrated embodiment, the sharing prediction neural network 500 includes some components of a typical object classification convolutional neural network (CNN). For example, the sharing prediction neural network 500 comprises a set of feature learning layers 502, e.g., a set of convolution, RELU, and pooling layers. The sharing prediction neural network 500 further comprises a flatten layer 522, which is a component of a typical object classification CNN. The sharing prediction neural network 500 further comprises a set of classification layers 504, e.g., a concatenation layer, a fully connected layer and a softmax layer 520. The softmax layer 520 may determine class probabilities for the outputs, e.g., the probability of the output being YES. It is noted that the term "softmax layer" is used, however, other layers that similarly determine output scores can alternatively be used. The sharing prediction neural network 500 also includes a recurrent neural network (RNN) 506 that is not part of a typical object classification CNN. The outputs of the RNN 506 are concatenated with the CNN flatten layer 522 in the concatenation layer mentioned above.

In embodiments, the inputs received by the sharing prediction neural network 500 comprise an image 508 and a questionnaire 510 that includes one or more questions and one or more corresponding (YES/NO) answers to the given questions. In an embodiment, the text-words (such as "person") in each questionnaire question are encoded using a pre-trained word embedding, such as word2vec resulting in encoded-words $W_1$-$W_k$ (where each of $W_1$, $W_2$, $W_3$, ... $W_k$ is a vector of numbers), and each answer is a numeric representation of a YES/NO answer. As shown, the inputs to the RNN 506 are the encoded-words $W_1$-$W_k$ in a question (encoded, for example, using word2vec). The RNN outputs a question encoding 512. Once the RNN 506 encodes the first questionnaire question, a question-answer (QA) vector 515A is formed for the question-answer pair by concatenating the RNN output encoding the question 512 with the numeric representation of the answer 514. The process is repeated for the second question-answer pair in the questionnaire to form QA vector 515B, 515N, etc. QA vectors 515A, 515B, . . . , 515N are collectively referred to as QA vectors 515, where N is the number of questions in the questionnaire.

In embodiments, the sharing prediction neural network 500 includes buffers that capture the QA vectors 515. In an embodiment the size of the encoding for each question that is produced by RNN 506 is fixed and the same for each question in the questionnaire 510. In an embodiment the RNN is a many-to-one RNN. The flatten layer 522 transforms its input from the feature learning layers 502 into a 1-dimensional vector. The QA vectors 515 are concatenated with the output of the flatten layer 522 to form a concatenated vector. The concatenated vector is input to a fully connected layer. Although not shown in the figure, it is contemplated that every element of the concatenated vector is connected to every input of the fully connected layer. Note also that in embodiments additional fully connected layers (not shown in the figure) may be present and fully connected following (in series) the fully connected layer shown in the figure. The output of the (final) fully connected layer serves as input to a softmax layer 520. Although not shown in the figure, it is contemplated that each output of the (final) fully connected layer is connected to each input of the softmax layer 520. The softmax layer 520 provides an image shareability decision. For example, the softmax layer 520 may provide a probability that the image shareability decision is a YES for the given image 508, which can be compared to a threshold to produce a YES or NO for the given image 508. The probability can be interpreted as a confidence, e.g., a probability close to 1 that the image shareability decision for the image is a YES can be interpreted as a high confidence in the prediction that the image shareability decision is a YES.

The sharing prediction network 500 is trained using training samples. Each training sample includes an image associated with a user, a questionnaire associated with the user and a sharing annotation associated with the image for the user. The sharing annotation associated with the image for the user provides the correct output for each training sample. In an embodiment, some weights, e.g., the weights in the RNN 506 may be frozen, i.e., not modified when the sharing prediction neural network 500 is being trained, while other weights are trained. The frozen weights may be those learned on an existing dataset for an appropriate text-based task. In another embodiment, the sharing prediction neural network 500 is trained end-to-end. In other words, all weights in the network are learned. A set of the typical object classification CNN's components (e.g., feature layers 502) may be pre-trained, e.g., using a large training dataset, such as ImageNet. Similarly, the RNN 506 may be pre-trained, e.g., on a dataset for an appropriate text-based task. It is noted that, for example, during inference for computational efficiency, processing on the questionnaire questions and answers can be re-used, instead of re-computed, for different images corresponding to the same questionnaire, e.g., for different images associated with a given user. Moreover, in an embodiment, only answers, not questions, change from user to user, so for example during inference, the RNN encodings of the questions can be re-used, i.e., not recomputed, for each user. Other methods of incorporating the answer into the QA vectors are possible, e.g., an answer can be included as an encoded-word at the end of the question and encoded by the RNN 506 along with the question. In that case a separate numeric representation of the answer 514 would not be needed. The CNN components that encode the image can be replaced by other means for encoding the image, such as one based on a transformer.

In an embodiment, a CNN, rather than an RNN can be used to encode the questions or questions and answers. Moreover, other network architectures are possible where one branch encodes the image and another encodes the questionnaire, e.g., a fully-connected deep neural network can be used to encode the questionnaire, while a CNN is used to encode the image.

In an alternative embodiment, question answers may be multiple-choice, in which case the numeric representation of the answer may be larger than the numeric representation for a binary answer. In some embodiments, alternative means may also be used to encode the questionnaire input. For example, important text-words or important n-grams may be selected before encoding the questionnaire questions using word embeddings, for example using term-frequency-inverse-document (tf-idf) as a measure of importance. In an embodiment the same number of important text-words or n-grams may be selected for each question. Padding may be added if the question contains fewer than the selected number of important text-words or n-grams. It is also noted that the object classification portions of the sharing prediction neural network 500 do not need to be trained explicitly on content asked about in the questionnaire.

Figure 6:
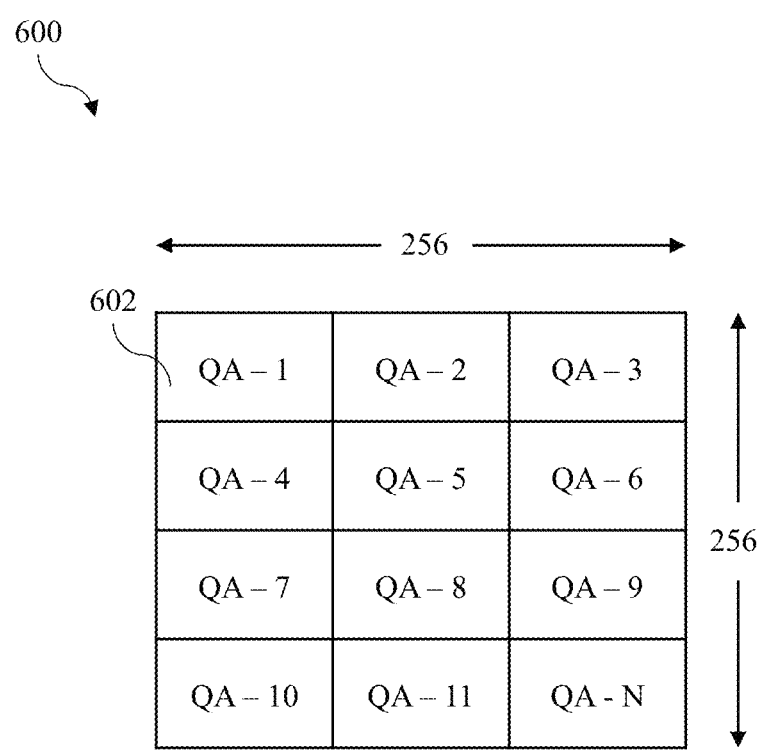
FIG. 6 illustrates an example diagram for encoding a set of questions and answers of a questionnaire into a matrix, in accordance with embodiments of the present disclosure.

Referring now to FIG. 6, shown is an example diagram for encoding a set of questions and answers of a questionnaire into a matrix 600, in accordance with an alternative embodiment of the present disclosure. This method of encoding a set of questions and answers of a questionnaire is suitable for an alternative embodiment where the neural network used to output sharing predictions is a convolutional neural network [CNN] with 4 input channels, 3 RGB channels that represent the image and a $4^{th}$ channel that represents the questionnaire input. The matrix 600 may be created by using natural language processing to determine S salient text-words from each question and answer pair from a given questionnaire. In some embodiments, the S salient text-words may be determined automatically using tf-idf. In some embodiments, the S salient text-words may be determined manually if there are a limited number of questions in the questionnaire. In an embodiment, n-grams are used instead of text-words.

In embodiments, the system is configured to encode each of the questions and answers 602 (referred to in the figure as QA-1 through QA-N) in a matrix 600 that is similar to a an RGB channel in common representation of an image matrix (e.g., h×w×3). For example, a color channel of an RGB image may be represented in a 256×256 matrix as having numbers between 0 and 255. In the illustrated embodiment, the questions and answers 602 may be represented as integer values between 0 and 255. Each S salient text-word may be represented with a pre-trained embedding vector of a dimension d.

In embodiments, each entry in the vector may be scaled to a value of 0 to 127. Based on the answers to the given questions, the vector entries may be multiplied by −1 if the answer to the question is "NO" and 1 if the answer is "YES." Once the entries are multiplied according to the given answer, an integer value of 128 may be added to the vector entries to create values between 0 and 255. The representation of the questions and answers 602 are placed in an m×k region of the h×w×1 matrix. In embodiments, for a questionnaire having q questions, values are provided for S, d, m, and k such that the representation of the q questions and answers fit within the h×w×1 matrix. Padding may be added as needed. It is noted that for this embodiment, the $4^{th}$ channel input corresponding to the questionnaire is the same for all images associated with a given user, so during training only the image inputs change from training sample to training sample within groups of training samples corresponding to a given user. As a result, some embodiments may, for example, employ a lower learning rate for the 4th channel in the first layer of the CNN.

In an alternative embodiment, the encoded questionnaire input may be appended to an image. For example, the h×w×1 matrix representation described above can be appended to the bottom of each of the 3 dimensions of the RGB matrix representing the image, forming an augmented image of dimension 2h×w×3. This method of encoding a set of questions and answers of a questionnaire is suitable for an alternative embodiment where the neural network used to output sharing predictions is a CNN with 3 input channels. In an alternative embodiment, the matrix representing the questionnaire can be of different dimensions, e.g., instead of being h×w×1, as shown in FIG. 6, it can be r×w×1, where r can be a different number than h. In that case, values are provided for S, d, m, and k such that the representation of the q questions and answers fit within the r×w×1 matrix. In that case, the augmented image would be of dimension (h+r)×w×3. It is noted that the input corresponding to the questionnaire that is appended to the image is the same for all images associated with a given user, so during training only the image inputs change from training sample to training sample within groups of training samples corresponding to a given user.

Figure 7:
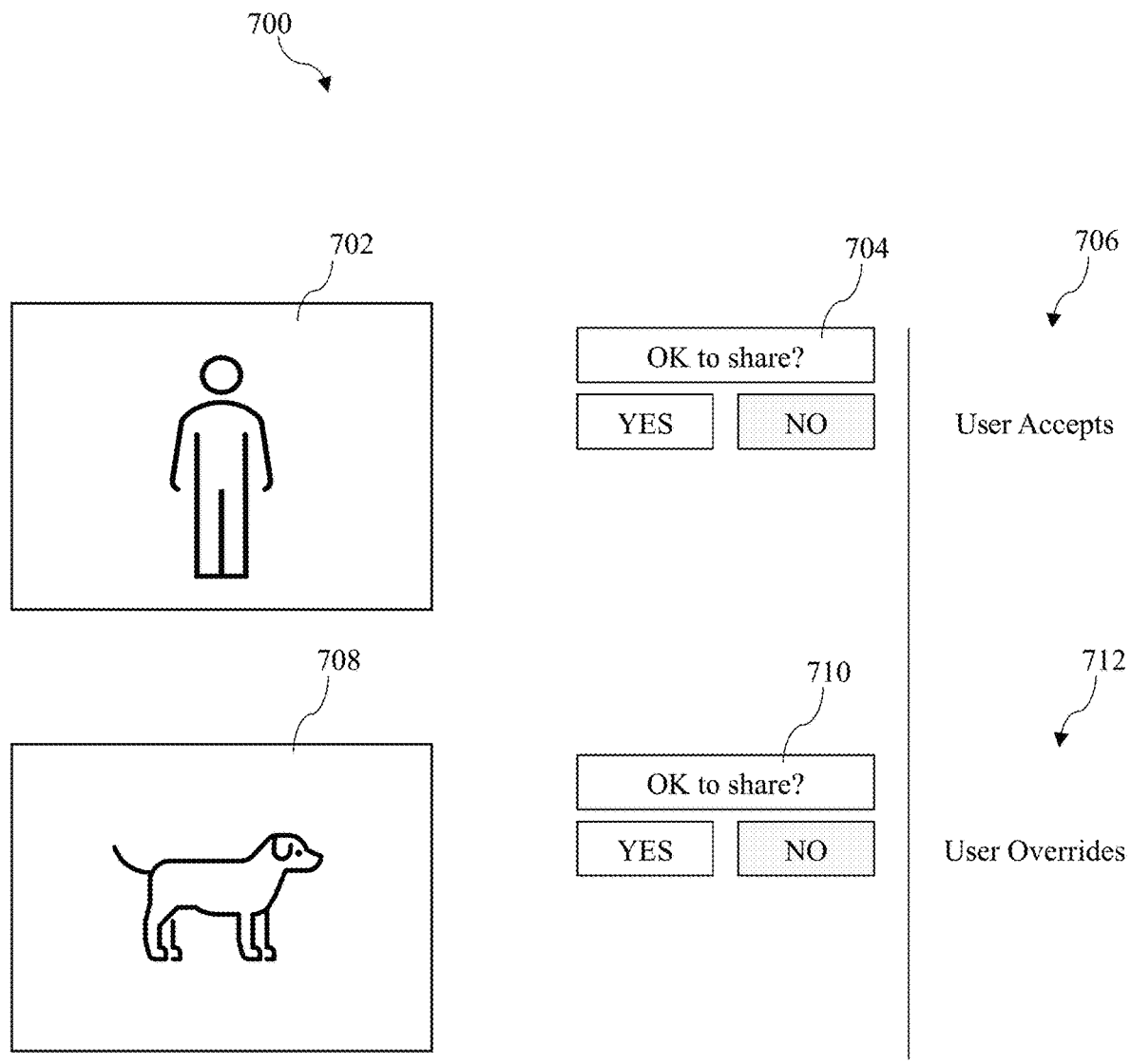
FIG. 7 illustrates an example diagram of set of image sharing decisions outputted by the neural network, in accordance with embodiments of the present disclosure.

Referring now to FIG. 7, shown is an example diagram 700 of a set of image sharing decisions outputted by the system, in accordance with embodiments of the present disclosure. In the illustrated embodiment, the system displays a first image 702 showing a single person. The system outputs a first image sharing decision 704 to the user requesting confirmation that the image is acceptable to share. For example, the "YES" and "NO" blocks may be predetermined based on the image sharing decision/sharing prediction. The "YES" and "NO" determinations may be based on a confidence score. For example, the user interface may automatically display the "YES" in a first color (e.g., green) to indicate that the first image 702 has been determined to be acceptable to share, while the "NO" block is a second color (e.g., shaded gray) indicating the user may choose to override/decline the first image sharing decision. In some embodiments, the shades of green and grey displayed, for example, may be used to indicate the system's confidence in the prediction. For example, a brighter green may be used to indicate a higher confidence in the prediction than a lighter green. Based on the first image 702 and the predicted first image sharing decision 704, the user chooses to accept 706 the first image sharing decision. In embodiments, the images and image sharing decisions may be displayed on a user interface, such as a user interface of remote device 120 (e.g., smartphone, laptop, smartwatch, etc.).

In some embodiments, a predicted image sharing decision (e.g., "YES") may cause the system to automatically default to sharing the given image if the user has approved automatic sharing. In this way, the user would not be prompted to confirm each image sharing decision, rather the system would automatically share images according to the given image sharing decision. In some embodiments, image sharing decisions that indicate that the system will not share the image ("NO") may not be shown to the user, rather they would be automatically kept private without user input or confirmation. However, in some embodiments, the user may choose to see all image sharing decisions (e.g., "YES" and "NO" sharing decisions) to confirm or override the image sharing decision/prediction. In some embodiments, images may be automatically shared without prompting the user if the system's confidence score in a "YES" decision for the image is above a first threshold, automatically not shared without prompting the user if the confidence score in a "YES" decision is below a second threshold, and the user may be prompted if the confidence score in a "YES" decision is between the first and second thresholds.

In another example, the system displays a second image 708 depicting a dog. The system displays a second image sharing decision 710 that indicates the image is not acceptable to share ("NO"). However, in this example, the user chooses to override 712 the second image sharing decision 710.

It is noted that the example diagrams shown in FIG. 7 are not meant to be limiting and that different embodiments for displaying the images and image sharing decisions may be utilized that are within the scope of the disclosure.

Referring now to FIG. 8A-FIG. 8C, shown are example shareability predictions for a first user, in accordance with embodiments of the present disclosure. FIG. 8A shows an image input (image 1) and a questionnaire input (questionnaire u1) that are associated with a first user (u1). Using the questionnaire input (questionnaire u1) and the image input (image 1), neural network 800 is configured to output a shareability prediction 802A for image 1 that is specific for the first user. For example, if image 1 includes a landscape or scenic picture only (no people), the neural network 800 may output a YES as shareability prediction 802A indicating that image 1 is a shareable image. FIG. 8B shows an image input (image 2) and a questionnaire input (questionnaire u1) that are associated with a first user (u1). Using the questionnaire input (questionnaire u1) and the image input (image 2), neural network 800 is configured to output a shareability prediction 802B for image 2 that is specific for the first user. In this instance, image 2 may contain images of a person and the neural network 800 may output a NO as shareability prediction 802B indicating image 2 is not to be shared. FIG. 8C shows an image input (image N) and a questionnaire input (questionnaire u1) that are associated with a first user (u1). Using the questionnaire input (questionnaire u1) and the image input (image N), neural network 800 is configured to output a shareability prediction 802N for image N that is specific for the first user. The image shareability prediction 802N is dependent on the questionnaire input (questionnaire u1) associated with the first user and what is depicted in the image input (image N).

Referring now to FIG. 8D and FIG. 8E, shown are example shareability predictions for a second user, in accordance with embodiments of the present disclosure. FIG. 8D shows image input (image 1) and a questionnaire input (questionnaire u2) that are associated with a second user (u2). Using the questionnaire input (questionnaire u2) and the image input (image 1), neural network 800 is configured to output a shareability prediction 802D for image 1 that is specific for the second user. For example, if image 1 is the same picture as image 1 of FIG. 8A (having a landscape or scenic picture only), the neural network 800 may output a NO as shareability prediction 802D indicating that image 1 is not a shareable image for the second user whose answers to the questionnaire may be different than the first user (u1) of FIG. 8A. FIG. 8E shows image input (image 4) and a questionnaire input (questionnaire u2) that are associated with a second user (u2). Using the questionnaire input (questionnaire u2) and the image input (image 4), neural network 800 is configured to output a shareability prediction 802E for image 4 that is specific for the second user.

Figure 9:
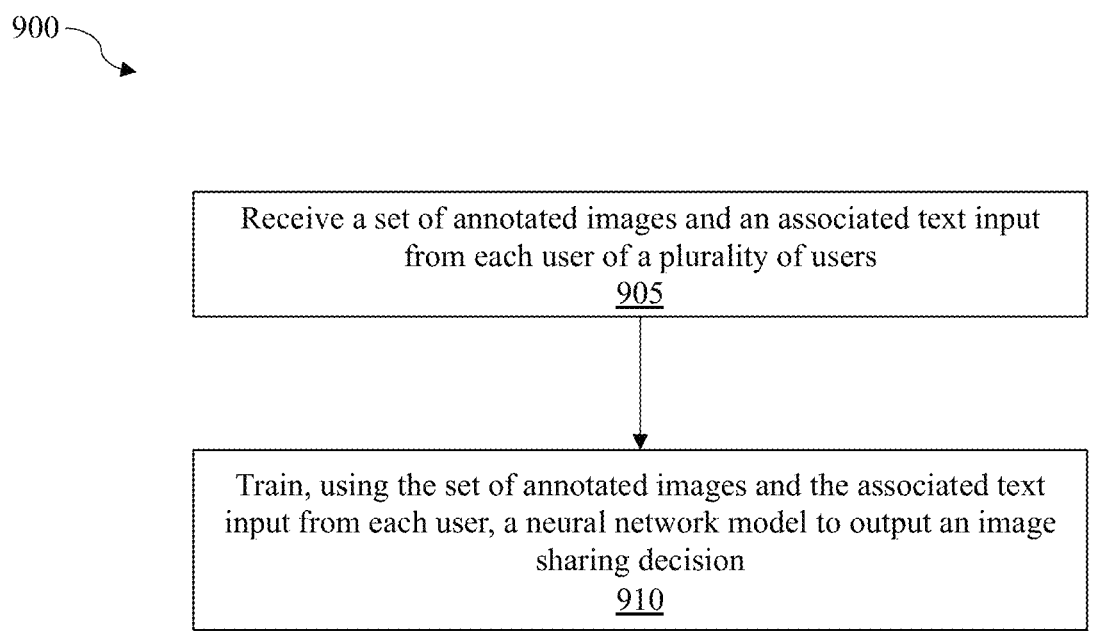
FIG. 9 illustrates a flow diagram of an example process for training a neural network model to predict an image sharing decision, in accordance with embodiments of the present disclosure.

Referring now to FIG. 9, shown is a flow diagram of an example process 900 for training a neural network model to predict an image sharing decision, in accordance with embodiments of the present disclosure. The process 900 may be performed by processing logic that comprises hardware (e.g., circuitry, dedicated logic, programmable logic, microcode, etc.), software (e.g., instructions run on a processor), firmware, or a combination thereof. In some embodiments, the process 900 is a computer-implemented process. The process 900 may be performed by processor 106 exemplified in FIG. 1.

The process 900 begins by receiving a set of annotated images and an associated text input from each user of a plurality of users. This is illustrated at step 905. For example, host device 102 may receive the set of annotated images and associated text input from data center 130 or remote device 120 via a user input. In some embodiments, the set of annotated images includes a set of annotations indicating a sharing preference for each image. For example, the annotation may indicate if the given user is willing to share the given type of image ("YES" or "NO"). In embodiments, the associated text input may be a questionnaire. The questionnaire may include a set of questions and answers related to sharing preferences each user. For example, the questions may be related what type of images you are willing to share (e.g., images of people, animals, landscapes, food, etc.). The annotations denote sharing preferences on specific images.

The process 900 continues by training, using the set of annotated images and the associated text input from each user, a neural network model, wherein the neural network model is configured to output an image sharing decision. This is illustrated at step 910. In some embodiments the neural network model may utilize a machine learning engine (e.g., machine learning engine 112) to collect annotated images and completed questionnaires from a plurality of users to train a two-stream neural network that includes components of both a convolutional neural network (CNN) and a recurrent neural network (RNN) to make image sharing decisions. The image sharing decision is tailored to a given user by use of the user's questionnaire. For example, the neural network model may predict a sharing decision "YES" for a given image for a first user, but may predict a sharing decision "NO" for the same image for a second user, if the completed questionnaire is different for the first and second users. The neural network model learns relationships between the training images, the questionnaires, and the image sharing annotations to determine sharing preferences.

In some embodiments, the system may be used to make image sharing decisions pertaining to use cases other than social media sharing/privacy. For example, a questionnaire may include questions related to determining if sports photos would be of interest for a news article. For example, the questions may be about whether content suitable for the article includes high-fives, cheering, tennis courts or swimming pools. If the article aims to describe victory celebrations, the article's questionnaire may say yes to high-fives and cheering but no to tennis courts or swimming pools, whereas if the article aims to describe sports venues, the article's questionnaire may say yes to tennis courts and swimming pools. In this case, the "user" is the article or the article's author. In this case making a sharing decision means, for example, deciding whether or to make the image made visible to the article's author. Here, the term "sharing" is used broadly to mean making an image visible or presenting an image to a user or audience. In embodiments, an automated method to identify images of interest for an article may be used, where automated means no human needs to look through an extensive image library. Intuition about what might be of interest in an article is used when designing the article-related questionnaire, in the same way intuition is used to determine questions that would go on a social-media-related/privacy-related shareability questionnaire. The integration of text input with image input during neural network training makes it possible to make the system work without requiring an image classifier to explicitly recognize content referred to in the questionnaire. Other examples of automated image sharing preference prediction made possible by the system disclosed herein include determining whether or not to show buyers in a real estate context certain images from a photo library, where images may show types of properties only some of which are of interest. It is contemplated that the system may be used for multiple image sharing prediction use cases and the examples are not meant to be limiting.

It is noted that users may have different sharing preferences for different audiences, e.g., different preferences for sharing with friends versus on a public website. To support determining different preferences for different audiences, training data comprising questionnaires and sets of annotated image input may be collected for one audience and a different set of annotated images and questionnaires collected for a different audience. Separate models may be trained for each audience and the appropriate model chosen when making a sharing prediction for an image. Multiple models, each applying to a different audience, could be applied to each image to determine a sharing decision for the image for the user for the audience. Alternatively, the sharing prediction system can be trained with multi-class outputs corresponding to different audiences. Both the questionnaire questions and image annotations would be specific to audience-type to support that use case, and a single model could be trained with multiple class outputs corresponding to the different audiences, e.g., the classes could be (1) YES for public and private, (2) NO for public, YES for private (3) YES for public, NO for private, and (4) NO for public, NO for private.

Further, it is noted that an advantage of the present disclosure is that if a user changes his/her mind on one or more sharing preferences that are captured by the questionnaire questions, the user can update his/her questionnaire. The system can then run inference on his/her existing collection of images with the new questionnaire to identify any images whose sharing preference was predicted to be YES with the original questionnaire but is predicted to be NO with the new questionnaire (or vice versa) and prompt the user to change the sharing status on any image whose prediction changed.

Figure 10:
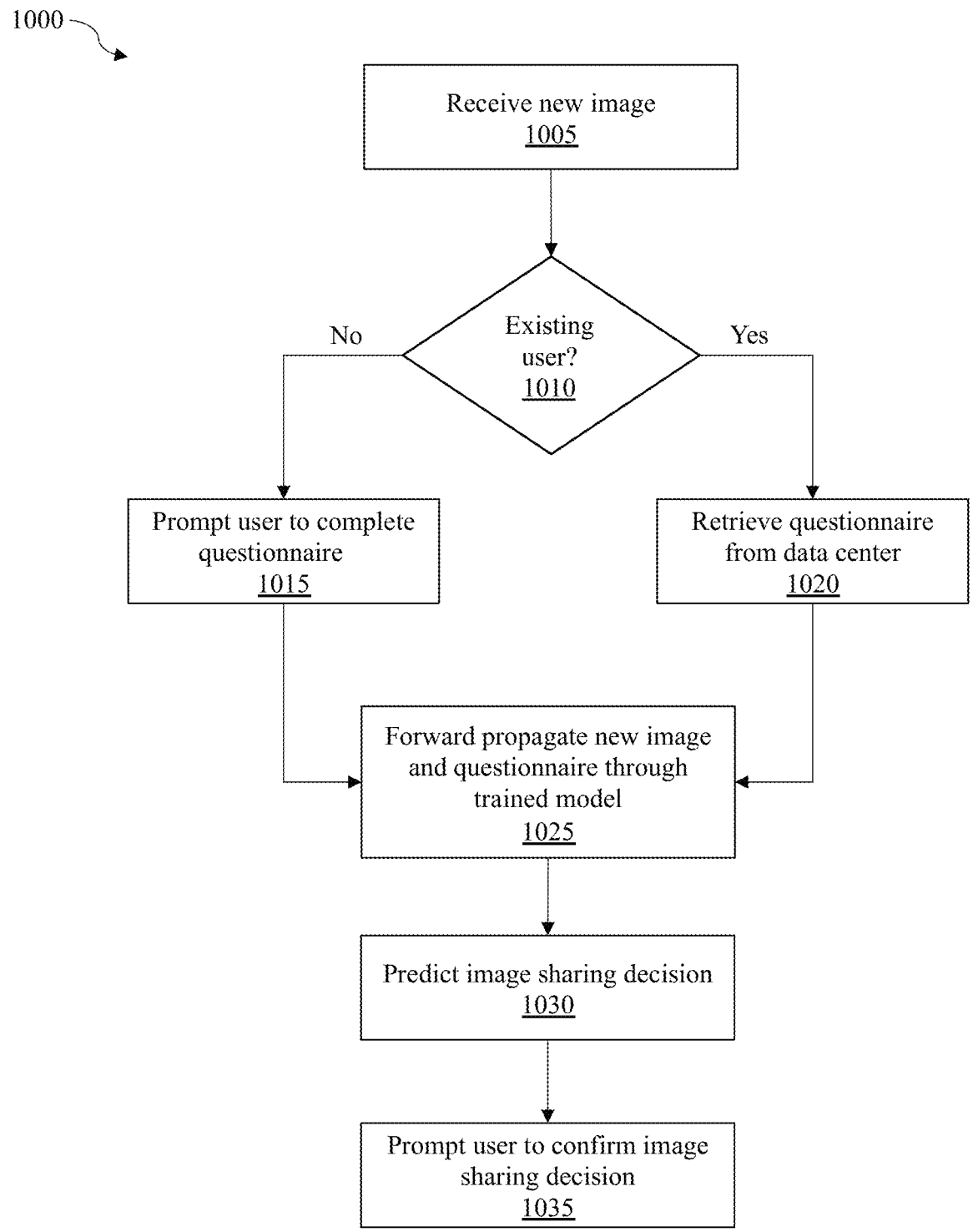
FIG. 10 illustrates a flow diagram of an example process for evaluating a new image using a neural network, in accordance with embodiments of the present disclosure.

Referring now to FIG. 10, shown is a flow diagram of an example process 1000 for evaluating a new image using the neural network, in accordance with embodiments of the present disclosure. The process 1000 may be performed by processing logic that comprises hardware (e.g., circuitry, dedicated logic, programmable logic, microcode, etc.), software (e.g., instructions run on a processor), firmware, or a combination thereof. In some embodiments, the process 1000 is a computer-implemented process. In embodiments, process 1000 may be in addition to or a subset of process 900. The process 1000 may be performed by processor 106 exemplified in FIG. 1.

The process 1000 begins by receiving a new image. This is illustrated at step 1005. For example, the system 100 may receive a new image or images inputted or uploaded by a user, where the image or images require an image sharing decision. For example, the new image(s) may be received from remote device 120.

The process 1000 continues by determining whether the owner of the new image is an existing user or a new user. This is illustrated at step 1010. If the owner of the new image is an existing user (e.g., determined through an identification value or recognition of the user's remote device) "YES" at step 1010, the process 1000 continues by retrieving the user's previously completed questionnaire. This is illustrated at step 1020. If the owner of the new images is a new user, "NO" at step 1010, then the process 1000 will continue by prompting the new user to complete a questionnaire. This is illustrated at step 1015.

In some embodiments, the new user may only need to complete the questionnaire depending on the amount of training data initially used to build the neural network model. However, if the neural network model only has limited training data, which may for example result in the accuracy of the image sharing prediction for the new user being low (e.g., low confidence score), the new user may be required to submit a set of annotated images and completed questionnaire to allow the system to retrain the neural network. The process 1000 continues by forward propagating the new image and encoded questionnaire through the neural network. This is illustrated at step 1025.

The process 1000 continues by predicting an image sharing decision. This is illustrated at step 1030. For example, the system will use the neural network to make a specific image sharing decision for the given user. In some embodiments, once the image sharing decision is made, the system may automatically share or not share the new image without the need for user confirmation. In some embodiments, the system may automatically share the image if the image sharing decision meets a certain confidence threshold. This obviates the need for the system to require user verification when performing image sharing decisions. However, in some embodiments, the system may send a notification or prompt to inform a user that the model has shared a given image as a result of the image sharing decision. This allows the user to review any images that were shared and make changes to the sharing preferences if needed.

In some embodiments, the process 1000 may continue by prompting the user to confirm if the image sharing decision is correct. This is illustrated at step 1035. For example, the user may override the image sharing decision if the user determines that they do not agree with the predicted image sharing decision. For example, the image sharing decision might indicate that the system will keep a picture containing people private. However, the user may want to override that image sharing decision and allow the picture of the of the people to be shared. The system may use the updated or changed image sharing decision as feedback for the neural network model.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various host devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 11:
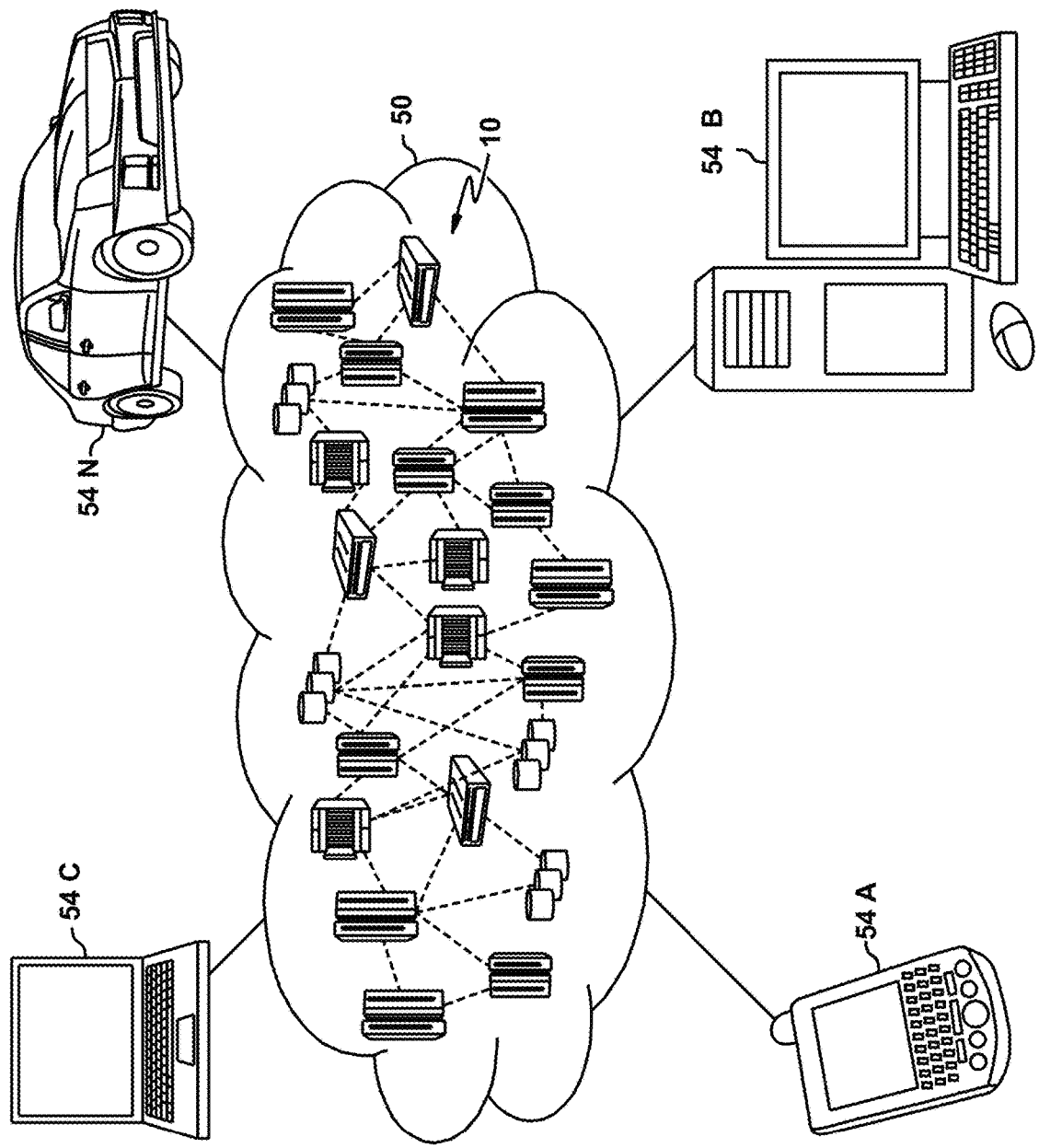
FIG. 11 depicts a cloud computing environment in accordance with embodiments of the present disclosure.

Referring now to FIG. 11, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
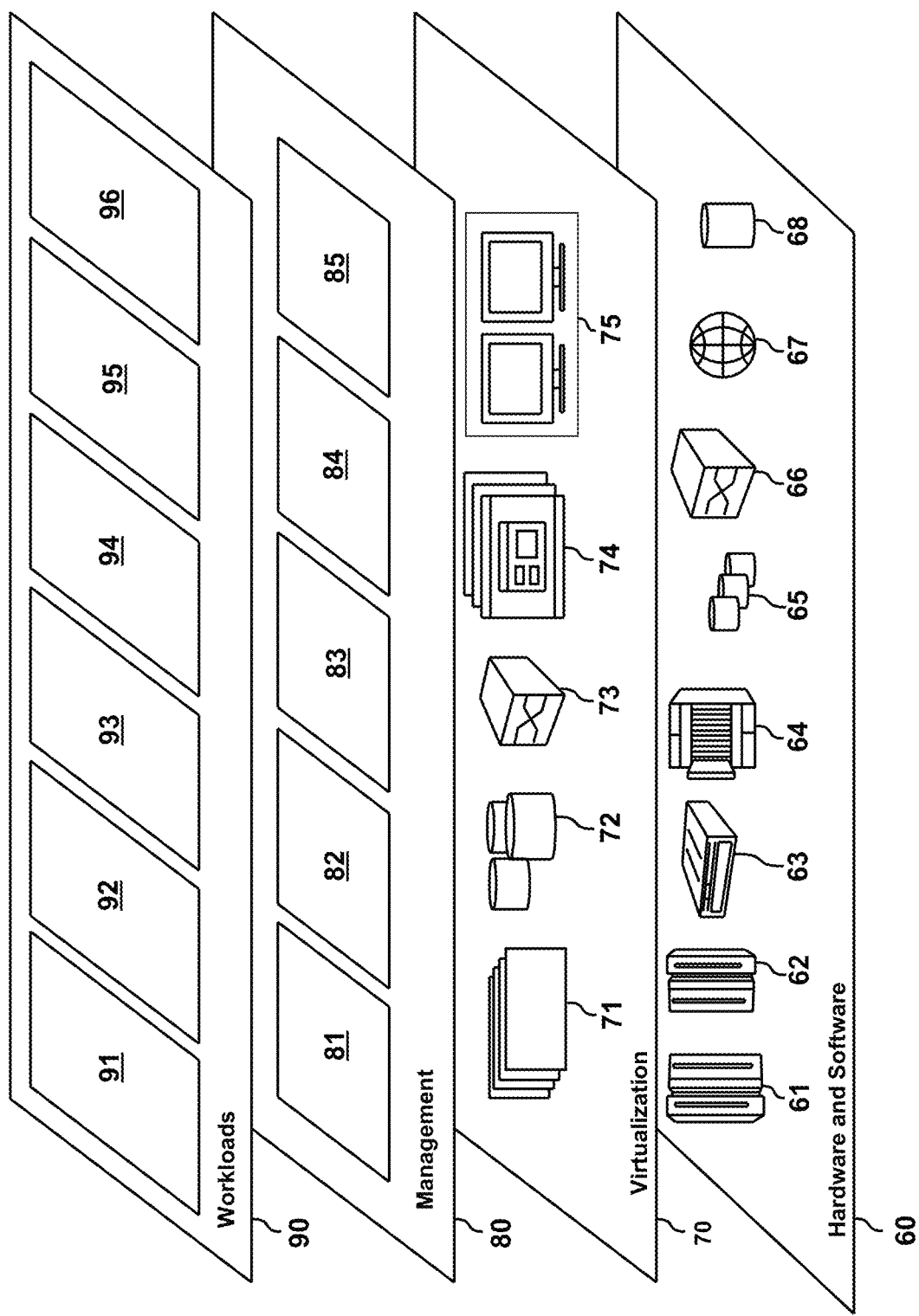
FIG. 12 depicts abstraction model layers in accordance with embodiments of the present disclosure.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and image sharing prediction software 68 in relation to the image sharing prediction system 100 of FIG. 1.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and image sharing prediction 96. For example, image sharing prediction system 100 of FIG. 1 may be configured to perform image sharing predictions using workloads layer 90.

Figure 13:
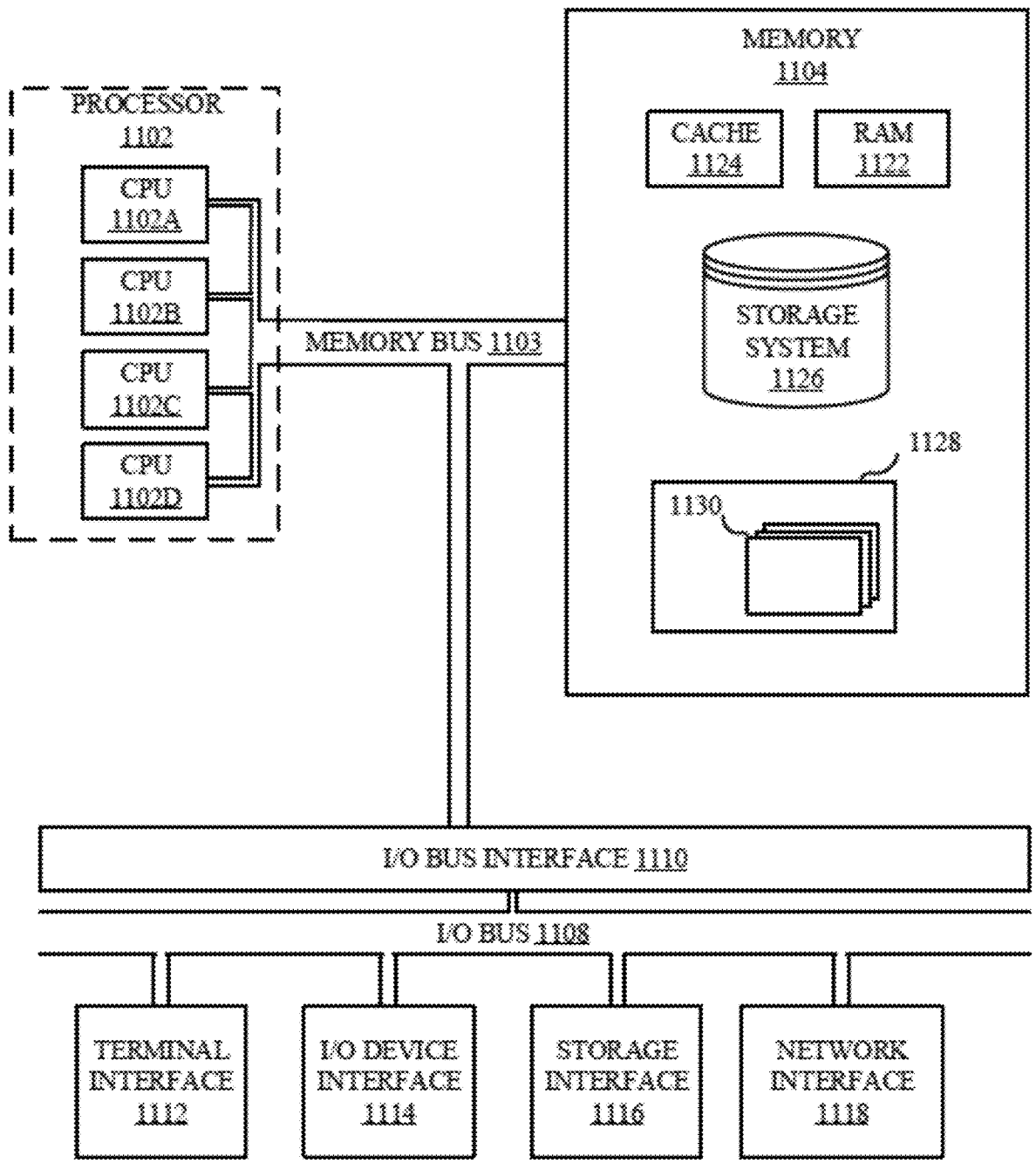
FIG. 13 illustrates a high-level block diagram of an example computer system that may be used in implementing one or more of the methods, tools, and modules, and any related functions, described herein, in accordance with embodiments of the present disclosure.

Referring now to FIG. 13, shown is a high-level block diagram of an example computer system 1101 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 1101 may comprise one or more CPUs 1102, a memory subsystem 1104, a terminal interface 1112, a storage interface 1116, an I/O (Input/Output) device interface 1114, and a network interface 1118, all of which may be communicatively coupled, directly or indirectly, for inter-component communication via a memory bus 1103, an I/O bus 1108, and an I/O bus interface 1110.

The computer system 1101 may contain one or more general-purpose programmable central processing units (CPUs) 1102A, 1102B, 1102C, and 1102D, herein generically referred to as the CPU 1102. In some embodiments, the computer system 1101 may contain multiple processors typical of a relatively large system; however, in other embodiments the computer system 1101 may alternatively be a single CPU system. Each CPU 1102 may execute instructions stored in the memory subsystem 1104 and may include one or more levels of on-board cache. In some embodiments, a processor can include at least one or more of, a memory controller, and/or storage controller. In some embodiments, the CPU can execute the processes included herein (e.g., process 900 and 1000).

System memory subsystem 1104 may include computer system readable media in the form of volatile memory, such as random-access memory (RAM) 1122 or cache memory 1124. Computer system 1101 may further include other removable/non-removable, volatile/non-volatile computer system data storage media. By way of example only, storage system 1126 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory subsystem 1104 can include flash memory, e.g., a flash memory stick drive or a flash drive. Memory devices can be connected to memory bus 1103 by one or more data media interfaces. The memory subsystem 1104 may include at least one program product having a set (e.g., at least one) of program modules that are configured to carry out the functions of various embodiments.

Although the memory bus 1103 is shown in FIG. 13 as a single bus structure providing a direct communication path among the CPUs 1102, the memory subsystem 1104, and the I/O bus interface 1110, the memory bus 1103 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 1110 and the I/O bus 1108 are shown as single units, the computer system 1101 may, in some embodiments, contain multiple I/O bus interfaces 1110, multiple I/O buses 1108, or both. Further, while multiple I/O interface units are shown, which separate the I/O bus 1108 from various communications paths running to the various I/O devices, in other embodiments some or all of the I/O devices may be connected directly to one or more system I/O buses.

In some embodiments, the computer system 1101 may be a multi-user mainframe computer system, a single-user system, or a server computer or similar device that has little or no direct user interface, but receives requests from other computer systems (clients). Further, in some embodiments, the computer system 1101 may be implemented as a desktop computer, portable computer, laptop or notebook computer, tablet computer, pocket computer, telephone, smart phone, network switches or routers, or any other appropriate type of electronic device.

It is noted that FIG. 13 is intended to depict the representative major components of an exemplary computer system 1101. In some embodiments, however, individual components may have greater or lesser complexity than as represented in FIG. 13, components other than or in addition to those shown in FIG. 13 may be present, and the number, type, and configuration of such components may vary.

One or more programs/utilities 1128, each having at least one set of program modules 1130 may be stored in memory subsystem 1104. The programs/utilities 1128 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs/utilities 1128 and/or program modules 1130 generally perform the functions or methodologies of various embodiments.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., $100a$, $100b$, $100c$) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method comprising:
receiving an annotated set of images and an associated text input from each user of a plurality of users, wherein the associated text input from each user comprises a set of questions and answers related to image sharing preferences, and the associated text input is separate from annotations associated with the annotated set of images; and
training, using the annotated set of images and the associated text input from each user of the plurality of users, a neural network model to output an image sharing decision for an unannotated image that is specific to a user.

2. The computer-implemented method of claim 1, further comprising:
receiving a first image and a text input from a first user;
applying the neural network model to the first image and the first text input; and
providing a first image sharing decision for the first image to the first user.

3. The computer-implemented method of claim 1, wherein the associated text input is encoded before being input to the neural network model.

4. The computer-implemented method of claim 1, wherein the neural network model is a two-stream neural network that comprises components of both a convolutional neural network and a recurrent neural network.

5. The computer-implemented method of claim 1, wherein each image in the set of annotated images received from each user is annotated with the respective user's image sharing preferences for the image.

6. The computer-implemented method of claim 1, wherein a training sample used to train the neural network model comprises an image annotated with a respective user's sharing preference for the image and a text input associated with the respective user.

7. The computer-implemented method of claim 1, wherein the image sharing decision provided to the user indicates a confidence in the image sharing decision.

8. The computer-implemented method of claim 1, wherein the neural network model is a 4-channel convolutional neural network.

9. The computer-implemented method of claim 8, wherein a first input to 3 of the input channels is an image and a second input to the $4^{th}$ channel is a text input.

10. A system comprising:
a processor; and
a computer-readable storage medium communicatively coupled to the processor and storing program instructions which, when executed by the processor, cause the processor to perform a method comprising:
receiving an annotated set of images and an associated text input from each user of a plurality of users, wherein the associated text input from each user comprises a set of questions and answers related to image sharing preferences, and the associated text input is separate from annotations associated with the annotated set of images; and training, using the annotated set of images and the associated text input from each user of the plurality of users, a neural network model to output an image sharing decision for an unannotated image that is specific to a user.

11. The system of claim 10, wherein the method performed by the processor further comprises:

receiving a first image and a text input from a first user;

applying the neural network model to the first image and the first text input; and providing a first image sharing decision for the first image to the first user.

12. The system of claim 10, wherein the associated text input is encoded before being input to the neural network model.

13. The system of claim 10, wherein the neural network model is a two-stream neural network that comprises components of both a convolutional neural network and a recurrent neural network.

14. A computer program product comprising a computer-readable storage medium having program instructions embodied therewith, the program instructions executable by a processor to cause the processor to perform a method comprising:

receiving an annotated set of images and an associated text input from each user of a plurality of users, wherein the associated text input from each user comprises a set of questions and answers related to image sharing preferences, and the associated text input is separate from annotations associated with the annotated set of images; and training, using the annotated set of images and the associated text input from each user of the plurality of users, a neural network model to output an image sharing decision for an unannotated image that is specific to a user.

15. The computer program product of claim 14, wherein the method performed by the processor further comprises:

receiving a first image and a text input from a first user;

applying the neural network model to the first image and the first text input; and providing a first image sharing decision for the first image to the first user.

16. The computer program product of claim 14, wherein the associated text input is encoded before being input to the neural network model.

17. The computer program product of claim 14, wherein the neural network model is a two-stream neural network that comprises components of both a convolutional neural network and a recurrent neural network.

18. The computer-implemented method of claim 1, wherein text words of each question of the set of questions and answers are encoded using a pre-trained word embedding and each answer is a numeric representation of a yes or no answer.

19. The computer-implemented method of claim 18, wherein a question-answer vector is formed from each encoded question and answer pair.

* * * * *